United States Patent Office 3,711,511
Patented Jan. 16, 1973

3,711,511
3-AZA - 19 - HYDROXY-3,19-CYCLO-A-HOMO-STEROIDS AND PROCESS FOR THEIR MANUFACTURE
Oskar Jeger, Zollikerberg, and Ueli Wehrli, Schaffhausen, Switzerland, assignors to Ciba-Geigy Corporation, Ardsley, N.Y.
No Drawing. Filed Sept. 19, 1969, Ser. No. 859,582
Claims priority, application Switzerland, Sept. 27, 1968, 14,491/68
Int. Cl. C07d 41/08
U.S. Cl. 260—326.5 B
13 Claims

ABSTRACT OF THE DISCLOSURE

The invention relates to new 3-aza-19-hydroxy-3,19-cyclo-A-homo-steroids, especially those corresponding to the formula

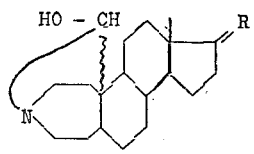

wherein R=a free or ketalized oxo group or
a β-positioned free, esterified or etherified hydroxyl group together with an α-positioned hydrogen atom, a lower alkyl, alkenyl or alkinyl group, or
α-positioned free, esterified or etherified hydroxyl group together with an acetyl or hydroxyacetyl group or
the 1′,5′-dimethylhexyl group together with an α-positioned hydrogen atom;

Use a strong local anaesthetic.
And a process of preparing the new compounds.

The present invention provides new 3-aza-19-hydroxy-3,19-cyclo-A-homo-steroids, preferably of the androstane, pregnane or cholestane series, especially those of the general formula

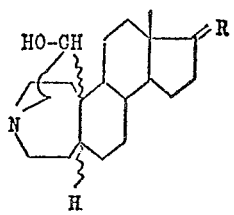

in which R represents a free or ketalized oxo group, for example the ethylenedioxy group or a β-positioned free, esterified or etherified hydroxyl group together with a hydrogen atom or with a lower aliphatic hydrocarbon residue or an α-positioned hydrogen atom or an α-positioned free, esterified or etherified hydroxyl group together with an acetyl or hydroxyacetyl group or their derivatives or an α-positioned hydrogen atom together with the 1′,5′-dimethylhexyl group.

The said new compounds of the above formula represents the cyclic form of the corresponding 19-oxo-3-aza-A-homosteroids and this open form can be obtained as such after acylation. These open compounds are likewise included in the present invention.

An esterified hydroxyl group is more especially a hydroxyl group esterified with an aliphatic, alicyclic, araliphatic, aromatic or heterocyclic carboxylic acid containing no more than 20 carbon atoms, for example formic, methylcarbonic, acetic, trifluoroacetic, trimethylacetic, propionic, capric, decanoic, undecylenic, hexahydrobenzoic, cyclopentylpropionic, phenylpropionic, benzoic or furancarboxylic acid. An etherified hydroxyl group is especially etherified with an aliphatic, cycloaliphatic, araliphatic or heterocyclic alcohol, such as a lower alkanol, or furanyl or pyranyl alkanol.

Suitable lower aliphatic hydrocarbon residues are, for example, lower alkyl such as methyl, ethyl, propyl or isopropyl residues, lower alkenyl such as vinyl, allyl or methallyl residues, or lower alkinyl such as ethinyl or propinyl residues. The term "lower" used above or below in connection with hydrocarbon or alkanoyl residues designates those residues which contain no more than 5 carbon atoms.

The new compounds possess valuable pharmacological properties. Inter alia, they act strongly on the central nervous system, in a similar manner to that of the salamander alkaloids. Furthermore, they have a strong local anaesthetic activity and may, therefore, be used in veterinary medicine. They are also intermediates for the manufacture of the salamander alkaloids and their derivatives. Thus, 17-substituted androstane compounds may be used for the manufacture of the highly active salamander alkaloid cycloneosamandione or of its derivatives.

The new 3-aza-19-hydroxy-3,19-cyclo-A-homo-steroids are obtained when a compound of the formula

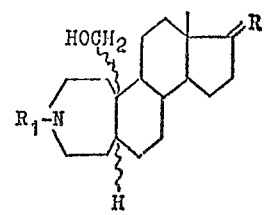

in which $R_1$ represents hydrogen or a lower alkanoyl residue, especially the acetyl residue, and R has the above meaning, is treated with an oxidant capable of converting a primary hydroxyl group into an aldehyde group, and a possibly obtained 3-N-lower alkanoyl-19-oxo compound is hydrolyzed, if desired a possibly present esterified or etherified hydroxyl group or a protected oxo group is liberated, a free hydroxyl group is esterified or etherified or oxidized to the oxo group and/or an oxo group present is reduced to the hydroxyl group is eliminated by reduction.

These reactions are performed in a known manner. Thus, the oxidation of the 19-hydroxyl group to the aldehyde group may be achieved with chromic acid or a derivative thereof, for example with chromium trioxide in sulphuric acid or pyridine or with sulphur trioxide +pyridine complex in dimethylsulphoxide. In this reaction—when the starting materials are not alkanoylated at the nitrogen atom—the ring is closed at the same time and a 19-hydroxy-3,19-cyclo compound is formed. However it is preferable to use starting materials that are acylated at the nitrogen atom in the 3-position, when oxidation furnishes the 3-lower alkanoyl -19-oxo compound which on being hydrolyzed is immediately rearranged to the 19-hydroxy-3,19-cyclo-compound. This hydrolysis is preferably performed with a strongly acid agent, such as a strong inorganic acid, for example sulphuric or hydrochloric acid.

Any ester or protective groups present in a resulting 3,19-cyclo compound, such as a ketal, can be split hydrolytically and free hydroxyl groups can be oxidized to oxo groups. On the other hand, process products containing free hydroxyl groups can be converted into their esters in a known manner, for example by acylation with anhydrides or halides of carboxylic acids, whereby at the same time also the 3,19-ring can be opened and the aza group acylated. The starting materials are new and are accessible for instance by reacting a 19-hydroxy-2- or 3-oxo-steroid with hydroxylamine or a salt thereof and subjecting the resulting oxime to the Beckmann rearrangement and reducing the oxo group in position 2 or 4.

The invention includes also any variant of the process in which an intermediate obtained at any stage of the process is used as starting material and any remaining step(s) is/are carried out, or in which the starting materials are formed under the reaction conditions or the reactants may be used in the form of their salts.

The new compounds of the Formula I may be used as medicaments, for example in the form of pharmaceutical preparations containing them in conjunction or admixture with an organic or inorganic solid or liquid pharaceutical excipient suitable for enteral or parenteral administration. Suitable excipients are substances that do not react with the new compounds, for example water, gelatin lactose, starches, stearyl alcohol, magnesium stearate, talcum, vegetable oils, benzyl alcohols, gums, propyleneglycol, polyalkyleneglycols, cholesterol or other known medicinal excipients. The pharmaceutical preparations may be, for example tablets, dragees or capsules, or in liquid form solutions suspensions or emulsions or ointments or creams. They may be sterilized and/or contain assistants such as preserving, stabilizing wetting or emulsifying agents, solubilizers, salts for regulating the osmotic pressure or buffers. They may further contain other therapeutically valuable substances. The pharmaceutical preparations are formulated by known methods.

The new compounds can also be used in veterinary medicine, for example in one of the forms mentioned above or in the form of feedstuffs or additives to feedstuffs using, for example, the conventional extenders and diluents or feedstuffs respectively.

The following examples illustrate the invention without restricting it in any manner. The infrared spectra have been recorded in chloroform.

EXAMPLE 1

A solution of 780 mg. of 3-aza-17β,19-dihydroxy-A-homo-5α-androstane in 75 ml. of 3% sulphuric acid is treated dropwise at 90° C. within 30 minutes with about 54 ml. of 0.2 N-chromium trioxide solution, then a few drops of methanol are added, and the solution is alkalinized with dilute sodium hydroxide solution and extracted with methylenechloride, the extract is washed, dried and evaporated. The residue is recrystallized 3 times from acetone+petroleum ether, to furnish 3-aza-17-oxo-19-hydroxy-3,19-cyclo-A-homo-5α-androstane melting at 251–252° C. $[\alpha]_D = +85°$ (c.=0.46 in chloroform). Its infrared spectrum contains bands at 3300–3500 and 1730 cm.$^{-1}$.

EXAMPLE 2

A solution of 100 mg. of N-acetyl-3-aza-17β,19-dihydroxy-A-homo-5α-androstane in 5 ml. of dimethylsulphoxide and 3 ml. of triethylamine is mixed with 1.5 g. of pyridine+sulphur trioxide complex in 5 ml. of dimethylsulphoxide while being cooled and then stirred for 3 days at 20° C. Usual working up and chromatography on silica gel furnishes N-acetyl-3-aza-17,19-dioxo-A-homo-5α-androstane which melts at 161–162° C. after crystallization from acetone+petroleum ether.$[\alpha]_D = +65°$ (c.=0.37 in chloroform).

15 mg. of this product in 15 ml. of N-aqueous hydrochloric acid are heated for 18 hours at 100° C. The solution is rendered alkaline and extracted with methylenchloride. Usual working up of the extract furnishes 3-aza-17-oxo-19-hydroxy - 3,19 - cyclo-A-homo-5α-androstane which is identical with the compound described in Example 1.

EXAMPLE 3

A solution of 408 ml. of 3-aza-17β,19-dihydroxy-A-homo-5β-androstane in 40 ml. of 3% sulphuric acid is mixed dropwise within 30 minutes at 90° C. with about 40 ml. of 0.2 N-chromium trioxide solution. A few drops of methanol are added, the solution alkalinized with diluite sodium hydroxide solution and extracted with methylenechloride; the extract is washed, dried and evaporated and recrystallized from acetone+ether to furnish 3-aza-17-oxo-19-hydroxy-3,19-cyclo-A-homo-5β - androstane which melts above 280° C. with decomposition. $[\alpha]_D = 0°$ (c.=0.55 in chloroform).

EXAMPLE 4

Oxidation of N-acetyl-3-aza-17β,19-dihydroxy-A-homo-5β-androstane in an analogous manner with chromium trioxide in sulphuric acid furnishes N-acetyl-3-aza-17,19-dioxo-A-homo-5β-androstane which melts at 167–168° C. after two recrystallizations from methylene chloride+petroleum ether+ether. $[\alpha]_D = +68°$ (c.=0.50 in chloroform). Infrared bands at 2720, 1735, 1720 and 1630 cm.$^{-1}$.

15 mg. of this compound in 15 ml. of N-aqueous hydrochloric acid are heated for 18 hours at 100° C. and worked up in the usual manner and crystallized from acetone +ether, to yield 3 - aza-17-oxo-19-hydroxy-3,19-cyclo-A-homo-5β-androstane which is identical with the compound described in Example 3.

EXAMPLE 5

Oxidation as described in Example 2 of N-acetal-3-aza-17-oxo-19-hydroxy-A-homo-5α,10α-androstane with pyridine+sulphur trioxide complex furnishes N-acetyl-3-aza-17,19-dioxo-A-homo-5α,10α-androstane melting at 99° C. $[\alpha]_D = +56°$ (c.=0.40 in chloroform). Its infrared spectrum contains bands at 2720, 1735, 1710 and 1625 cm.$^{-1}$.

Hydrolysis of this compound with N-aqueous hydrochloric acid for 18 hours at 100° C. furnishes 3-aza-17-oxo-19-hydroxy - 3,19 - cyclo-A-homo-5α,10α-androstane melting at 269° C. $[\alpha]_D = +32°$ (c.=0.24 in chloroform).

EXAMPLE 6

A mixture of 100 mg. of 3-aza-17-oxo-19-hydroxy-3,19-cyclo-A-homo-5β-androstane, 0.5 ml. of acetic anhydride and 0.5 ml. of pyridine is heated for 1 hour on a waterbath. Usual working up furnishes N-acetyl-3-aza-17,19-dioxo-A-homo-5β-androstane which melts at 167–168° C. after crystallization from methylenechloride+petroleum ether+ether.

The starting materials used in the present examples may be prepared, for example, as follows:

EXAMPLE A

A mixture of 200 mg. of 2-oxo-17-ethylenedioxy-19-triphenyl-methoxy-Δ$^5$ - 10α - androstane and 200 mg. of hydroxylamine hydrochloride in 10 ml. of pyridine is boiled for 2 hours, then evaporated and the residue is taken up in methylenechloride and chromatographed on silica gel (Merck, 0.05–0.2 mm.), eluted with a 10:1 mixture of benzene and ethyl acetate, and the eluate is evaporated to furnish 2-oximino-17-ethylenedioxy-19-triphenylmethoxy-Δ$^5$-10α-androstene melting at 235–236° C. $[\alpha]_D = -30°$ (c.=0.57 in chloroform). Its infrared spectrum contains bands at 3580 and 1450 cm.$^{-1}$.

A solution of 5.1 g. of the above oxime in 25 ml. of absolute dioxan is mixed at 5° C. with 1.5 ml. of thionyl chloride. The mixture is kept for 2 hours at 20° C., then poured into an ice-cooled aqueous sodium bicarbonate solution and extracted with methylenechloride. Chromatography on silica gel and elution with a 1:2-mixture of benzene+ethyl acetate furnishes a mixture from which the 2-oxo-3-aza-17-ethylenedioxy-A-homo-19 - triphenylmethoxy-Δ$^5$-10α-androstene is separated by further chromatography on a stepped column. After two recrystallizations from acetone+petroleum ether the product melts at 229–230° C. [α]$_D$=−13° (c.=0.53 in chloroform). Its infrared spectrum contains bands at 3410, 1665 and 1450 cm.$^{-1}$.

700 mg. of the above compound with 1.4 g. of lithiumaluminium hydride in 250 ml. of dioxan are boiled for 20 hours, then water is dropped in while cooling with ice, the precipitated inorganic phase is filtered off, washed with methylenechloride and the filtrate is evaporated under vacuum. The crude product is acetylated with acetic anhydride and pyridine for 1 hour on a waterbath and then chromatographed on silica gel, to yield N-acetyl-3-aza-17-ethylenedioxy-19-triphenylmethoxy - Δ$^5$ - 10α - A-homoandrostene which, after crystallization from acetone+petroleum ether, melts at 150–155° C. [α]$_D$=−25° (c.=0.47 in chloroform), and N-acetyl-3-aza-17-ethylenedioxy-19-acetoxy-Δ$^5$-10α-A-homo - androstene melting at 112–114° C. [α]$_D$=−12° (c.=0.50 in chloroform).

18 mg. of N-acetyl-3-aza-17-ethylendioxy-19-acetoxy-Δ$^5$-10α-A-homo-androstene in 2 ml. of 5% aqueous acetic acid are boiled for 1 hour at 90° C., then evaporated under vacuum, chromatographed on silica gel and the unitary eluates are crystallized from ether+hexane. The resulting N-acetyl-3-aza-17-oxo-19-acetoxy-Δ$^5$ - 10α - A-homo-androstene melts at 144–145° C. [α]$_D$=+63 (c.=0.35 in chloroform). The infrared spectrum of this compound contains bands at 1735 (shoulder), 1630 and 1250 cm.$^{-1}$.

A mixture of 330 mg. of N-acetyl-3-aza-17-ethylenedioxy-19-triphenylmethoxy-Δ$^5$-10α-A - homo - androstene, 2 ml. of acetic anhydride and 0.5 ml. of boron trifluoride etherate is kept for 5 minutes at room temperature, then poured into an ice-cooled aqueous sodium bicarbonate solution, extracted with methylenechloride, and the extract is dried and avaporated. The resulting crude product is once more heated for 1 hour with 2 ml. of 5% acetic acid to remove the ketal group completely from it. After evaporation, chromatography and recrystallization N-acetyl-3-aza-17-oxo - 19 - acetoxy - Δ$^5$ - 10α - A - homo-androstene melting at 144–145° C. is obtained; according to the mixed melting point, infrared spectrum and thin-layer chromatogram it is identical with the product described above.

The starting material used in this example may be prepared, for instance, as follows:

1 gram of 2-oxo-17β-acetoxy-Δ$^5$-10α - androstene in 80 ml. of tetrahydrofuran and 2 g. of tri-tertiary butoxylithium aluminium hydride are refluxed for 2 hours, 5% aqueous acetic acid is added and the whole is worked up as usual. 2α-hydroxy-17β-acetoxy-Δ$^5$ - 10α - androstene melts at 200° C. after two recrystallizations from acetone+petroleum ether. [α]$_D$=−68° (c.=0.69 in chloroform). Bands in the infrared spectrum at 3610, 1724 and 1250 cm.$^{-1}$.

600 mg. of lead tetraacetate and 250 mg. of calcium carbonate are dried for 1 hour under a high vacuum, then suspended in 20 ml. of cyclohexane and boiled for 10 minutes. The boiling mixture is mixed with 130 g. of iodine and then with 100 mg. of 2α-hydroxy-17β-acetoxy-Δ$^5$-19α-androstene and boiled for another 1½ hours while being irradiated with two incandescent lamps (210 watt), then filtered through cottonwool, the solution is taken up in ethyl acetate, washed with thiosulphate and saturated sodium chloride solution, dried over magnesium sulphate and evaporated. Chromatography on silica gel in benzene+ethyl acetate 9:1 and crystallization from acetone+petroleum ether furnishes 2α,19-oxido-17β-acetoxy-19-oxo - Δ$^5$ - 10α - androstene melting at 180° C. [α]$_D$=+64° (c.=0.27 in chloroform).

1.7 grams of this compound are hydrolyzed in 140 ml. of saturated methanolic potassium carbonate solution overnight at 20° C. The batch is then acidified (pH=5) with dilute hydrochloric acid and evaporated and worked up, to furnish 2α,19-oxido-17β-hydroxy-19-oxo-Δ$^5$-10α-androstene which melts at 225° C. after crystallization from acetone+petroleum ether. [α]$_D$=+88° C. (c.=0.50 in chloroform).

1.35 grams of this product are dissolved in 70 ml. of acetone and 1.2 ml. of 8 N-chromium trioxide in 8 N-sulphuric acid are added at 0° C. After 1½ hours the excess oxidant is decomposed by adding a few drops of methanol. Usual working up furnishes 2α,19-oxido-17,19-dioxo-Δ$^5$-10α-androstene which melts at 208° C. after crystallization from acetone+petroleum ether. [α]$_D$=+175° (c.=0.66 in chloroform).

1.2 grams of this compound with 300 mg. of p-toluenesulphonic acid in a mixture of 200 ml. of benzene and 30 ml. of ethyleneglycol are boiled for 24 hours on a water separator, then poured into an ice-cooled aqueous sodium bicarbonate solution and taken up in methylenechloride, washed and dried and the extract is evaporated to yield 2α,19 - oxido-17-ethylenedioxy-19-oxo-Δ$^5$-10α-androstene which melts at 233° C. after crystallization from acetone+petroleum ether. [α]$_D$=+36° (c.=0.75 in chloroform).

750 mg. of this product are boiled for 3 hours with 1.1 g. of lithium aluminium hydride in 100 ml. of tetrahydrofuran. Usual working up furnishes 2α,19-dihydroxy-17-ethylenedioxy-Δ$^5$-10α-androstene melting at 224° C. [α]$_D$=−68° (c.=0.31 in chloroform).

316 mg. of this compound are boiled for 7 hours with 500 mg. of triphenylchloromethane in 30 ml. of pyridine, then evaporated and worked up in the usual manner. Chromatography in a 10:1-mixture of benzene+ethyl acetate and crystallization from acetone+petroleum ether furnishes 2α - hydroxy - 17 - ethylenedioxy-19-triphenylmethoxy-Δ$^5$-10α-androstene melting at 211–212° C. [α]$_D$=−33° (c.=0.58 in chloroform).

While cooling 10 ml. of pyridine, 1.3 g. of chromium trioxide, is added, then 780 mg. of the resulting 2α-hydroxy compound in 10 ml. of pyridine are added at 0° C. and the whole is kept for 18 hours at 20° C., then filtered through a glass suction filtered and the filtrate is taken up in ethyl acetate. Usual working up and chromatography in a 10:1-mixture of benzene and ethyl acetate and crystallization from acetone+petroleum ether furnishes 2-oxo-17-ethylenedioxy - 19 - triphenylmethoxy-Δ$^5$-10α-androstene melting at 215° C. [α]$_D$=−20° (c.=0.77 in chloroform).

EXAMPLE B

A mixture of 1764 mg. of 2-oxo-17-ethylenedioxy-19-triphenylmethoxy-5α, 10α-androstane and 1760 mg. of hydroxylamine hydrochloride in 80 ml. of pyridine is boiled for 2 hours, then evaporated and worked up in the usual manner. The resulting crude product is chromatographed on silica gel (Merck, 0.05–0.2 mm.) and eluted with a 10:1-mixture of benzene and ethyl acetate. The eluate is evaporated and recrystallized from acetone+petroleum ether, to furnish 2-oximino-17-ethylenedioxy-19-triphenylmethoxy-5α,10α-androstane melting at 210° C. [α]$_D$=−16° (c.=0.42 in chloroform).

A solution of 1460 mg. of this compound in 8 ml. of dioxan is mixed at 5° C. with 1 ml. of thionylchloride. The mixture is kept for 2 hours at 20° C., then poured into an ice-cooled aqueous sodium bicarbonate solution, taken up in methylenechloride and the extract is dried over sodium sulphate and evaporated, chromatographed on silica gel and eluted with ethyl acetate. Two crystallizations from acetone+petroleum ether furnish 2 - oxo-3-aza-17-ethylenedioxy-19-triphenylmethoxy - 5α,10α - A - homo-androstane melting at 267–269° C. [α]$_D$=+2° (c.=0.46 in chloroform).

A mixture of 275 ml. of this compound and 0.6 g. of lithiumaluminium hydride in 100 ml. of dioxane is boiled for 20 hours, then water is dropped in while cooling with ice, the precipitated inorganic phase is filtered off, washed with methylenchloride and the filtrate is evaporated to dryness. The resulting mixture is acetylated and chromatographed in the usual manner, to yield N-acetyl-3-aza-17-ethylenedioxy - 19 - triphenylmethoxy-5α,10α-A-homo-androstane melting at 202° C. $[α]_D=+18°$ (c.=0.45 in chloroform) and N - acetyl-3-aza-17-ethylendioxy-19-acetoxy-A-homo-5α,10α-androstane melting at 132–134° C. $[α]_D=+52°$ (c.=0.16 in chloroform).

N - acetyl-3-aza-17-ethylenedioxy - 19 - acetoxy-5α,10α-androstane can be hydrolyzed with acetic acid to form N-acetyl3-aza-17-oxo-19-acetoxy - 5α,10α - A - homo-androstane as described in Example 1 which melts at 171–172° C. after crystallization from acetone+petroleum ether. $[α]_D=+135°$ (c.=0.41 in chloroform).

In the manner described in Example 1 N-acetyl-3-aza-17 - ethylenedioxy-19-triphenylmethoxy-5α,10α-A-homo-androstane can be converted into N-acetyl-3-aza-17-oxo-19-acetoxy-5α,10α-A-homo-androstane which is identical with the compound described above.

90 mg. of N-acetyl-3-aza-17-oxo-19-acetoxy-5α,10α-A-homo-androstane are hydrolyzed overnight at room temperature in 10 ml. of saturated methanolic potassium carbonate solution. Usual working up and chromatography on silica gel in ethyl acetate+methanol 9:1 furnishes amorphous N - acetyl-3-aza-19-hydroxy-A-homo-5α,10α-androstane whose infrared spectrum contains bands at 3580, 1730 and 1625 cm.$^{-1}$.

The starting material used in this example may be prepared, for example, thus 500 mg. of 2α-hydroxy-17β-acetoxy-Δ$^5$-androstene in 75 ml. of ethanol are exhaustively hydrogenated in the presence of 100 mg. of palladium carbon catalyst (5% Pd). The catalyst is filtered off, the filtrate evaporated under vacuum and the crude product is taken up in methylenechloride and filtered through alumina (neutral, activity III) and chromatographed on silica gel, to furnish the oily 2α - hydroxy-17β-acetoxy-5α,10α-androstane whose infrared spectrum contains bands at 3600, 1725 and 1255 cm.$^{-1}$.

500 mg. of this compound are reacted with lead tetraacetate and iodine in cyclohexane as described in Example 1, then worked up and chromatographed on silica gel (Merck, 0.05–0-2 mm.). Recrystallization of the eluate from acetone+petroleum ether furnishes 2α,19 - oxido-17β - acetoxy-19-oxo-5α,10α-androstane melting at 174–175° C. $[α]_D=+37°$ (c.=0.40 in chloroform).

This compound is hydrolyzed by the method described in Example 1 to yield 2α,19-oxido-17β-hydroxy-19-oxo-5α,10α-androstane melting at 162–163° C. $[α]_D=+47°$ (c.=0.46 in chloroform), then oxidized to 2α,19-oxido-17,19 - dioxo - 5α,10α - androstane melting at 201° C., $[α]_D=+131°$ (c.=0.45 in chloroform), then converted into 2α,19-oxido - 17-ethylenedioxy-19-oxo-5α,10α-androstane melting at 229–230° C., $[α]_D=+19°$ (c.=0.48 in chloroform), reduced with lithium-aluminium hydride to form 2,19 - dihydroxy-17-ethylenedioxy-5α,10α-androstane melting at 194–196° C., $[α]_D=-14°$ (c.=0.56 in chloroform), which is then reacted with triphenylchloromethane to form 2α - hydroxy-17-ethylenedioxy-19-triphenylmethoxy - 5α,10α-androstane and then oxidized to form 2-oxo-17-ethylendioxy-19-triphenylmethoxy-5α,10α-androstane melting at 224° C., $[α]_D$ (c.=0.50 in chloroform).

EXAMPLE C 2 grams of 3-oxo-17β,19-diacetoxy-Δ$^4$-androstene and 2 g. of hydroxylamine hydrochloride in 40 ml. of pyridine are heated for 1½ hours at 90° C. and then evaporated under vacuum. The residue is taken up in methylenechloride, the solution washed neutral, dried over sodium sulphate and evaporated, to furnish 3-oximino-17β-19-diacetoxy-Δ$^4$-androstene as an amorphous product whose infrared spectrum contains bands at 3580, 1730 and 1240 cm.$^{-1}$.

A solution of 11.5 g. of this oxime in 50 ml. of dioxan is mixed with 2 ml. of thionylchloride. The reaction mixture is heated for 1 hour at 60° C., then neutralized with ice-cold aqueous sodium bicarbonate solution and extracted with methylenchloride. The extract is washed neutral, dried and evaporated, twice chromatographed on silica gel (Merck, 0.05–0.2 mm.) and eluted with a 10:1 mixture of ethyl acetate and methanol and recrystallized from acetone+petroleum ether, to yield 3-aza-4-oxo-17β,19-diacetoxy -A-homo-Δ$^{4a}$-androstene melting at 195° C. $[α]_D=+53°$ (c.=0.49 in chloroform). Its infrared spectrum contains bands at 3420, 1730, 1655 and 1240 cm.$^{-1}$.

3 grams of this product are exhaustively hydrogenated in the presence of 1 g. of palladium carbon catalyst in 200 ml. of ethanol. The catalyst is filtered off, the filtrate evaporated and the residue recrystallized from acetone +petroleum ether. The resulting 3-aza-4-ozo-17β,19-diacetoxy-A-homo-5α-androstane has the double melting point of 133/165° C. $[α]_D=3°$ (c.=0.39 in chloroform). Its infrared spectrum contains bands at 3410, 1730, 1665 and 1245 cm.$^{-1}$.

320 mg. of this product are boiled for 20 hours with 600 mg. of lithium -aluminium hydride in 100 ml. of dioxan. Then, while cooling with ice, water is dropped in, the precipitated inorganic phase is filtered off, washed with methylenechloride, and the filtrate is evaporated to dryness, to furnish crude 3 - aza - 17β-19-dihydroxy-A-homo-5α-androstane. 100 mg. of this product are acetylated for 1 hour in a waterbath and chromatographed on silica gel. Elution with ethyl acetate furnishes amorphous N-acetyl - 3-aza-17β,19-diacetoxy-A-homo-5α-androstane whose infrared spectrum contains bands at 1730, 1625 and 1250 cm.$^{-1}$.

50 mg. of this product are hydrolyzed overnight in 5 ml. of saturated methanolic potassium carbonate solution. Two crystallisations from acetone+petroleum ether furnish N-acetyl-3-aza-17β,19-dihydroxy-A-homo-5α-androstane melting at 244 to 246° C. $[α]_D=-23°$ (c.=0.44 in ethanol). Its infrared spectrum contains bands at 3500 —3100 and 1620 cm.$^{-1}$.

EXAMPLE D

A solution of 5.1 g. of 3-oxo-17β,19-diacetoxy-5β-androstane in 70 ml. of pyridine is boiled for 2 hours with 5.1 g. of hydroxylamine hydrochloride, then evaporated to dryness, taken up in methylenchloride, washed neutral and chromatographed on silica gel (Merck, 0.05–0.2 mm.), eluted with a 2:1-mixture of benzene+ethyl acetate, evaporated and the residue is twice recrystallized from ether+petroleum ether. The resulting 3-oximino-17β,19 - diacetoxy - 5β-androstane melts at 142° C. $[α]_D=+39°$ (c.=0.94 in chloroform). Its infrared spectrum contains bands at 3580, 1730 and 1250 cm.$^{-1}$.

2.1 grams of this product are dissolved in 10 ml. of dioxan and mixed at 5° C. with 1 ml. of thionylchloride. The mixture is kept for 2 hours at 20° C., then poured into ice-cooled aqueous sodium bicarbonate solution and extracted with methylenechloride. The extract is washed, dried over sodium sulphate and evaporated. After chromatography on silica gel and elution with ethyl acetate a product is obtained which melts at 204–206° C. After three recrystallizations from ether+petroleum ether the melting point rises to 205–207° C. $[α]_D=+29°$ (c.=0.53 in chloroform).

2 grams of this mixture of 3-aza-4-oxo- and 3-oxo-4-aza-17β,19-diacetoxy-A-homo-5β-androstane are boiled for 20 hours with 4 g. of lithium-aluminium hydride in 800 ml. of dioxan. Then while cooling with ice, water is dropped in, the precipitated inorganic phase is filtered off, rinsed with methylenechloride and the filtrate is evaporated, to yield after acylation a mixture of N-acetyl-3-aza- and N-acetyl-4-aza-17β,19-diacetoxy-A-homo-5β-androstane which melts at 144–145° C. after two recrystallizations from acetone+petroleum ether. $[α]_D=+28°$ (c.=0.40 in chloroform). Its infrared spectrum contains bands at 1730, 1625 and 1250 cm.$^{-1}$.

What we claim is:
1. 3-aza-19-hydroxy-3,19-cyclo-A-homo-steroids of the general formula

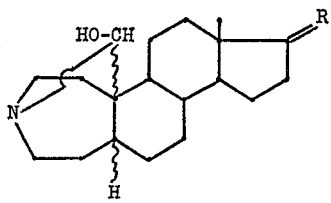

in which R represents oxo, ethylenedioxy, a β-positioned hydroxyl or acetoxyl group together with a hydrogen atom or with a lower alkyl, lower alkenyl or lower alkinyl radical, or an α-positioned hydrogen atom or an α-positioned hydroxyl or acetoxyl group together with an acetyl or hydroxyacetyl group of a β-positioned hydrogen atom together with the 1′,5′-dimethylhexyl group.

2. 3-aza-17-oxo - 19 - hydroxy - 3,19-cyclo-A-homo-5α-androstane.

3. 3-aza - 17 - oxo - 19-hydroxy-3,19-cyclo-A-homo-5β-androstane.

4. 3-aza-17-oxo - 19 - hydroxy - 3,19-cyclo-A-homo-5α, 10α-androstane.

5. Process for the manufacture of 3-aza-19-hydroxy-3,19-cyclo-A-homo-steroids, which comprises: treating a compound of the formula

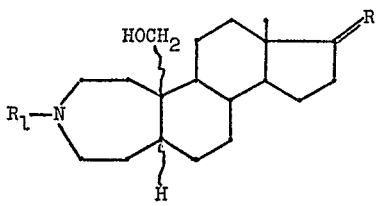

in which $R_1$ represents hydrogen or a lower alkanoyl radical and R stands for an oxo or ethylene dioxy group, hydroxyl or acetoxyl group together with a hydrogen atom or with a lower alkyl, lower alkenyl or lower alkinyl radical or an α-positioned hydrogen atom or an α-positioned hydroxyl or acetoxyl group together with an acetyl or hydroxyacetyl group, or an α-positioned hydrogen atom together with the 1′,5′-dimethyl-hexyl group, with chromium trioxide or sulfur trioxide to convert a primary hydroxyl group into an aldehyde group, and hydrolyzing any resulting 3-N-lower alkanoyl-19-oxo- compound.

6. Process according to claim 5, wherein chromium trioxide in sulfuric acid or pyridine is used to convert a primary hydroxyl group into an aldehyde group.

7. Process according to claim 5, wherein a sulfur trioxide-pyridine complex in dimethyl sulfoxide is used to convert a primary hydroxyl group into an aldehyde group.

8. Process according to claim 5 wherein a 3-lower alkanoyl-3-aza-19-hydroxy-A-homo-steroid is oxidized and then hydrolyzed.

9. Process according to claim 5, wherein 3-aza-17β,19-dihydroxy-A-homo-5α-androstane is used as starting material.

10. Process according to claim 5, wherein N-acetyl-3-aza-17β,19-dihydroxy-A-homo-5α-androstane is used as starting material.

11. Process according to claim 5, wherein N-acetyl-3-aza-17β,19-dihydroxy-A-homo-5β-androstane is used as starting material.

12. Process according to claim 5, wherein N-acetyl-3-aza-17β-acetoxy - 19 - hydroxy-A-homo-5β-androstane is used as starting material.

13. Process according to claim 5, wherein N-acetyl-3-aza - 17 - oxo - 19-hydroxy-A-homo-5α,10α-androstane is used as starting material.

References Cited
UNITED STATES PATENTS
3,530,170   9/1970   Scribner _____ 260—488

NICHOLAS S. RIZZO, Primary Examiner
J. A. NARCAVAGE, Assistant Examiner

U.S. Cl. X.R.
260—239 BB, 326.3; 424—274